Patented July 26, 1932

1,868,608

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

HALOGENATED DIBENZANTHRONE

No Drawing. Application filed March 27, 1930, Serial No. 439,536, and in Germany March 30, 1929.

The present invention relates to the halogenation of dibenzanthrones and isodibenzanthrones.

We have found that halogenation of dibenzanthrones which term is meant to comprise dibenzanthrone, isodibenzanthrone and their derivatives, is carried out with particular advantage in phosphoric acid, since the said acid may be used at high temperatures, for example above 200° C. without giving rise to side reactions as is the case with sulphuric acid or its derivatives which at higher temperatures would sulphonate or oxidize the initial material. The temperatures usually employed are, however, between about 60° to 200° C. Moreover, the bromo derivatives obtained in phosphoric acid differ from those obtained in sulphuric acid and its derivatives by the more reddish vats they furnish and by the more greenish shades produced therewith which in particular are less dependent on the dyeing conditions employed, especially as regards the temperature of the dye bath. Halogenation can be carried out with the free halogens or with halogenating agents, such as sulphuryl chloride, phosphorus tribromide, phosphorus pentachloride, phosphorus oxychloride, antimony pentachloride, iodine chloride and the like. Halogen-transferring catalysts as are usually employed in halogenation processes are preferably added to the reaction mixture, for example iodine, sulphur, selenium, iron, manganese, nickel, arsenic, bismuth, mercury and antimony. By introducing several different halogens into the dibenzanthrones, dyestuffs are obtained dyeing various shades. The introduction of several different halogens can be effected by starting with halogen dibenzanthrones prepared according to known methods and halogenating in phosphoric acid with a halogenating agent supplying a halogen different from that already contained in the initial material, or different halogens may be introduced simultaneously or successively in phosphoric acid solution, or halogen dibenzanthrones produced according to our invention may be further halogenated according to known methods.

The halogen dibenzanthrones are obtained in excellent yields by our process and almost in a pure state. The dyestuffs may, however, be purified, if desired, by recrystallization from organic solvents, or by dissolving them in concentrated sulphuric acid, precipitating by the addition of water their oxonium sulphates and decomposing the latter.

The following examples will further illustrate how this invention may be carried out in practice but the invention is not limited thereto.

Example 1

230 parts of pure dibenzanthrone are dissolved, while stirring, in 2300 parts of crystalline phosphoric acid at between 50° and 60° C., the reaction mixture being then slowly warmed to 120° C. after the addition of 1 part of iodine, 1 part of iron and 230 parts of bromine and kept at the said temperature until the bulk of the bromine has been consumed. The reaction mixture is then allowed to cool, the melt taken up with water and the precipitate filtered off. The reaction product, a dibromo derivative according to analysis, dissolves in concentrated sulphuric acid to give a violet solution and dyes the vegetable fibre from a violet vat very fast strong greenish navy-blue shades.

The crude dyestuff may, if desired, be purified by known methods, for instance by crystallization from organic solvents, by a treatment with oxidizing agents, for example by treating its aqueous paste with a sodium hypochlorite solution, or by way of its oxonium sulphate.

Example 2

23 parts of dibenzanthrone are introduced, while stirring, at 120° C. into 400 parts of a phosphoric acid of between about 95 and 100 per cent strength. After the addition of 2 parts of iodine and 50 parts of bromine the reaction mixture is heated to 160° C. and kept thereat for several hours, the temperature then being slowly raised to between 220° and 250° C., kept thereat for a short time, the reaction mixture being then allowed to cool and worked up as described in Example 1. The reaction product thus obtained is a tribromo derivative according to analysis, dissolves in sulphuric acid monohydrate to give a violet solution, furnishes a violet vat and dyes cotton greenish navy-blue shades of very good fastness.

Isodibenzanthrone can be brominated in the manner described with respect to dibenzanthrone in this and the foregoing examples. The dibromo and tribromoisodibenzanthrones thus obtained dissolve in concentrated sulphuric acid to give green solution and dye cotton reddish blue shades from blue vats.

*Example 3*

46 parts of pure dibenzanthrone are heated, while stirring, to 120° C. in 460 parts of phosphoric acid free from water after the addition of 2 parts of iodine while passing a current of chlorine into the reaction mixture which is kept at the said temperature until a sample furnishes clear violet dyeings. The reaction mixture is then allowed to cool, taken up with water and the reaction product, a trichlorodibenzanthrone according to analysis, separating in violet blue flakes filtered off. It dissolves in concentrated sulphuric acid to give a violet solution and dyes the vegetable fibre strong clear violet shades.

A green dyeing chloro derivative is obtained in an analogous manner from Bz-Bz'-dimethoxydibenzanthrone.

*Example 4*

10 parts of dibromodibenzanthrone obtainable by brominating dibenzanthrone in oleum are introduced, while stirring, into 100 parts of phosphoric acid free from water at 120° C. A current of chlorine is introduced to the melt after the addition of 1 part of iodine until a sample furnishes substantially more greenish navy-blue shades than the initial material which is the case after a few hours. The reaction mixture is then allowed to cool and worked up as usual. The bromochlorodibenzanthrone thus obtained dissolves comparatively difficultly in concentrated sulphuric acid to give a violet solution and dyes the vegetable fibre from a violet vat navy-blue shades of very good fastness.

What we claim is:—

1. A process of producing halogenated derivatives of the dibenzanthrone series, which comprises treating a dibenzanthrone in phosphoric acid with a halogenating agent at a temperature above 60° C.

2. A process of producing halogenated derivatives of the dibenzanthrone series, which comprises treating a dibenzanthrone in phosphoric acid with a halogenating agent in the presence of a halogen-transferring catalyst at a temperature above 60° C.

3. A process of producing halogenated derivatives of the dibenzanthrone series, which comprises treating a dibenzanthrone in phosphoric acid with a halogenating agent at a temperature between about 60° and 200° C.

4. A process of producing halogenated derivatives of the dibenzanthrone series, which comprises treating a dibenzanthrone in phosphoric acid with a halogenating agent in the presence of a halogen-transferring catalyst at a temperature between about 60° and 200° C.

In testimony whereof we have hereunto set our hands.

MAX ALBERT KUNZ.
KARL KOEBERLE.